US012148170B2

(12) United States Patent
Madden et al.

(10) Patent No.: US 12,148,170 B2
(45) Date of Patent: Nov. 19, 2024

(54) REMOTE CAMERA-ASSISTED ROBOT GUIDANCE

(71) Applicant: ObjectVideo Labs, LLC, Tysons, VA (US)

(72) Inventors: Donald Gerard Madden, Columbia, MD (US); Ethan Shayne, Clifton Park, NY (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 18/120,491

(22) Filed: Mar. 13, 2023

(65) Prior Publication Data

US 2023/0215017 A1 Jul. 6, 2023

Related U.S. Application Data

(63) Continuation of application No. 17/173,550, filed on Feb. 11, 2021, now Pat. No. 11,610,320.

(Continued)

(51) Int. Cl.
*G06T 7/20* (2017.01)
*G01C 21/20* (2006.01)
(Continued)

(52) U.S. Cl.
CPC ............... *G06T 7/20* (2013.01); *G01C 21/20* (2013.01); *G05D 1/0246* (2013.01); *G06T 7/70* (2017.01);
(Continued)

(58) Field of Classification Search
CPC ... G06T 7/20; G06T 7/70; G06T 2207/30232; G06T 2207/30241; G01C 21/20;
(Continued)

(56) References Cited

U.S. PATENT DOCUMENTS 8,525,853 B1 9/2013 Hickman
9,786,187 B1 * 10/2017 Bar-Zeev ............. G08G 5/0043
(Continued)

OTHER PUBLICATIONS

Delmerico et al., "Ascending Stairway Modeling from Dense Depth Imagery for Traversability Analysis," 2013 IEEE International Conference on Robotics and Automation (ICRA), Karlsruhe, Germany, May 6-10, 2013, pp. 2283-2290.

*Primary Examiner* — Amara Abdi
(74) *Attorney, Agent, or Firm* — Fish & Richardson P.C.

(57) ABSTRACT

Methods, systems, and apparatus for remote camera-assisted robot guidance are disclosed. A method includes obtaining images of objects approaching a door of a property; identifying candidate paths to the door based on the images of the objects approaching the door of the property; determining movement capabilities of the objects; storing the candidate paths to the door labeled by the movement capabilities of the objects that took the paths; determining capability information for a robot at the property that indicates movement capabilities of the robot; selecting, from the candidate paths, a path for the robot to take to the door based on the movement capabilities of the robot and the labels of the candidate paths; and providing guidance information to the robot that guides the robot to the door along the selected path.

19 Claims, 4 Drawing Sheets

Related U.S. Application Data

(60) Provisional application No. 62/978,669, filed on Feb. 19, 2020.

(51) Int. Cl.
| | | |
|---|---|---|
| *G05D 1/00* | (2006.01) | |
| *G06T 7/70* | (2017.01) | |
| *G06V 20/52* | (2022.01) | |
| *G06V 40/20* | (2022.01) | |
| *G07C 9/00* | (2020.01) | |
| *H04N 7/18* | (2006.01) | |

(52) U.S. Cl.
CPC .............. *G06V 20/52* (2022.01); *G06V 40/20* (2022.01); *G07C 9/00174* (2013.01); *H04N 7/183* (2013.01); *G06T 2207/30232* (2013.01); *G06T 2207/30241* (2013.01)

(58) Field of Classification Search
CPC ...... G05D 1/0246; G06V 20/52; G06V 40/20; G06V 20/10; G06V 20/17; G06V 40/10; G07C 9/00174; H04N 7/183; H04N 7/186
See application file for complete search history.

(56) References Cited

U.S. PATENT DOCUMENTS

| | | | |
|---|---|---|---|
| 10,303,171 B1 | 5/2019 | Brady et al. | |
| 10,353,388 B2 | 7/2019 | Schubert et al. | |
| 10,438,465 B1 * | 10/2019 | Bart | H04N 7/183 |
| 10,532,885 B1 | 1/2020 | Brady et al. | |
| 10,621,448 B2 * | 4/2020 | Schubert | B62D 1/28 |
| 10,698,409 B1 | 6/2020 | Siegel et al. | |
| 10,772,253 B2 | 9/2020 | Calleija et al. | |
| 11,222,299 B1 * | 1/2022 | Baalke | G01C 21/3691 |
| 11,282,310 B1 * | 3/2022 | Charling | H04W 12/64 |
| 11,488,077 B1 * | 11/2022 | Lyman | H04L 12/2825 |
| 2007/0216764 A1 | 9/2007 | Kwak | |
| 2012/0327241 A1 | 12/2012 | Howe | |
| 2016/0033966 A1 | 2/2016 | Farris et al. | |
| 2019/0043326 A1 | 2/2019 | Madden et al. | |
| 2019/0377349 A1 * | 12/2019 | van der Merwe | G05D 1/0231 |
| 2019/0378289 A1 * | 12/2019 | Stokking | G06T 7/593 |
| 2020/0249698 A1 | 8/2020 | Lu et al. | |
| 2020/0406459 A1 | 12/2020 | Park | |
| 2021/0009166 A1 * | 1/2021 | Li | G06F 16/909 |
| 2021/0256472 A1 * | 8/2021 | Javidan | H04W 4/12 |
| 2021/0397188 A1 | 12/2021 | Sato | |
| 2022/0139217 A1 | 5/2022 | Lin et al. | |

* cited by examiner

REMOTE CAMERA-ASSISTED ROBOT GUIDANCE

CROSS-REFERENCE TO RELATED APPLICATIONS

This application is a continuation of U.S. application Ser. No. 17/173,550, filed Feb. 11, 2021, which claims the benefit of the U.S. Provisional Application No. 62/978,669 filed Feb. 19, 2020. The disclosure of each of the foregoing applications is incorporated herein by reference.

TECHNICAL FIELD

This disclosure application relates generally to monitoring systems.

BACKGROUND

Many properties are equipped with property monitoring systems that include sensors and connected system components. Property monitoring systems can receive and analyze data from sensors that are internal and external to the property. Some property monitoring systems include cameras.

Robotic devices, e.g., aerial drones or ground transportation robots, can be used to deliver items to a property. A robotic device can have various movement capabilities that enable the robot to traverse different types of terrain.

SUMMARY

Techniques are described for remote camera-assisted robot guidance. Remote camera-assisted robot guidance can be used to guide a robot to a desired destination. A remote camera can be any camera that is separate from the robot, and that can capture images of the robot. For example, a remote camera may be a doorbell camera that is installed at a front door of a property and that can capture images of a delivery robot approaching the property.

The remote camera can collect images of the robot. The remote camera or another component of a property monitoring system can then identify and verify the robot, and determine capabilities of the robot. Based on the capabilities of the robot, the property monitoring system can provide guidance to the robot for approaching the door while avoiding obstacles and difficult terrain. The guidance can direct the robot to follow a path selected from a selection of stored candidate paths. The candidate paths can be generated based on observing robots with various capabilities approaching the property over time. Thus, remote camera-assisted robot guidance can assist the delivery robot in navigating from an initial location near the property, such as a street or sidewalk, to the door of the property.

Automated deliveries by ground transportation robots often use global positioning system (GPS) navigation to navigate to a destination property. Once arriving at the destination property, GPS navigation may be insufficient for guiding a robot to a delivery drop-off point, e.g., a door of the property. In order to approach the door, the robot may need to identify the door's location, identify types of terrain between the robot and the door, and navigate around various obstacles.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
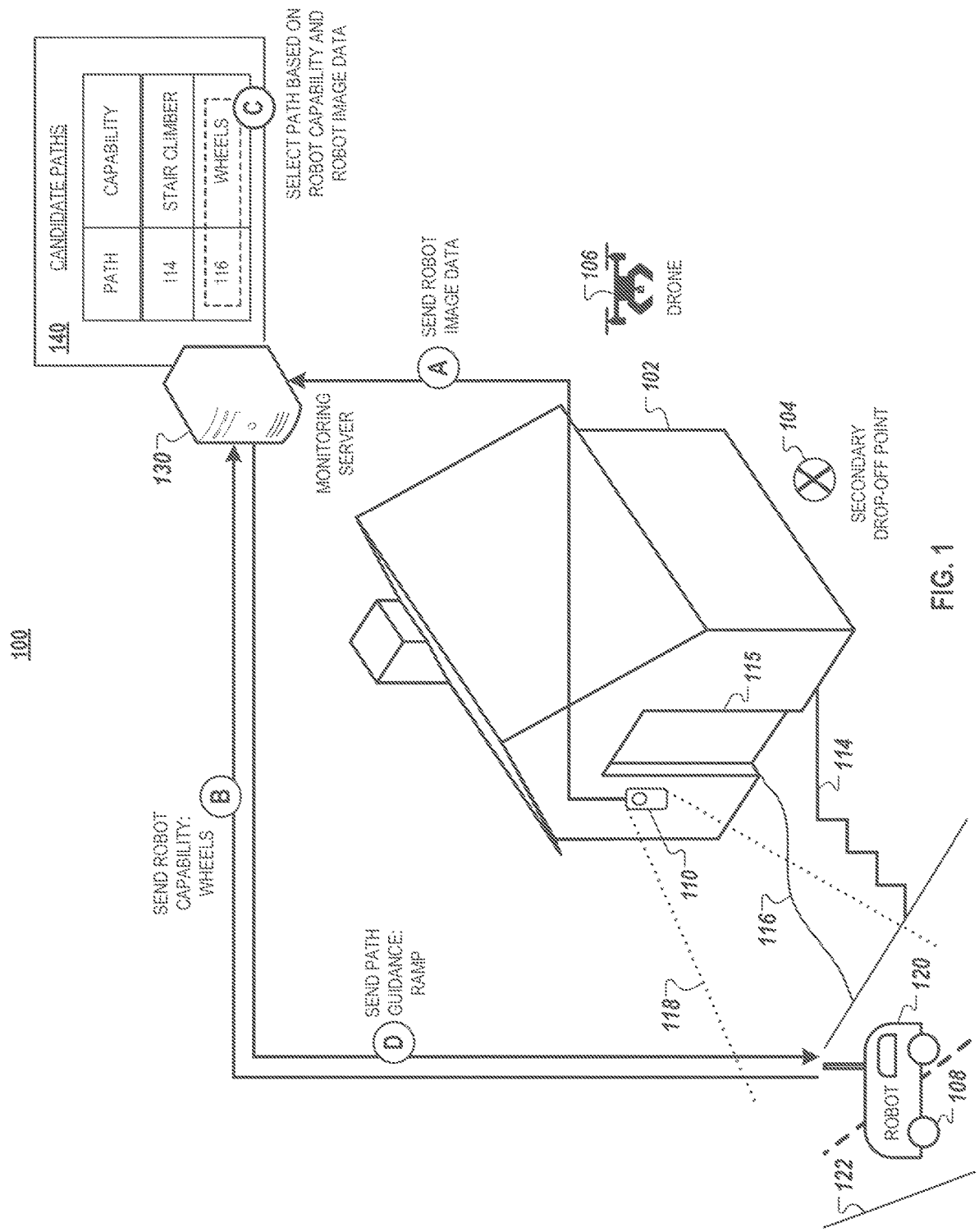
FIG. 1 illustrates an example system for providing remote camera-assisted robot guidance.

FIG. 1 is a diagram illustrating an example property monitoring system 100 for providing remote camera-assisted robot guidance. The system 100 includes a camera 110 installed at a property 102, a monitoring server 130, and a robot 120. The property 102 is monitored by the property monitoring system 100. The property 102 can be a home, another residence, a place of business, a public space, or another facility that is monitored by a monitoring system.

A camera 110 is installed at the property 102. The camera 110 can be, for example, a surveillance camera installed at the property 102. The camera 110 is installed external to the property 102. The camera 110 is installed near a door 115, facing a yard of the property 102. However, the camera 110 may instead be installed internal to the property 102. For example, the camera 110 may be inside the property 102 next to a window facing outwards with a clear view of a year of the property 102.

The camera 110 can be a component of a property monitoring system, e.g., a doorbell camera. In some examples, the camera 110 can be configured to record continuously. In some examples, the camera 110 can be configured to record at designated times, such as on demand, when triggered by another sensor of the property monitoring system 100, or when triggered by detection of object motion within a field of view 118 of the camera 110.

The camera 110 can capture visual images of scenes at the property within the field of view 118. The camera 110 may perform video analysis on captured images. Video analysis can include, for example, event detection, object detection, and object classification. In some examples, the camera 110 can send image data to a computing system, e.g., a monitoring server 130, and the monitoring server 130 can perform video analysis on the captured images. In some examples, the camera 110 and the monitoring server 130 can each perform video analysis on the captured images. For example, the camera 110 can perform object detection, while the monitoring server 130 can perform object classification.

To support communications with the monitoring server 130, the camera 110 can include a communications module, such as a modem, transceiver, modulator, or other hardware or software configured to enable the camera 110 to communicate electronic data to the monitoring server 130. The camera 110 can send data to the monitoring server 130 over a long-range data link. The long-range data link can include any combination of wired and wireless data networks. For example, the monitoring server 130 can exchange information with the camera 110 through a wide-area-network (WAN), a broadband internet connection, a cellular telephony network, a wireless data network, a cable connection, a digital subscriber line (DSL), a satellite connection, or other electronic means for data transmission. In some implementations, the long-range data link between the monitoring server 130 and the camera 110 is a secure data link (e.g., a virtual private network) such that the data exchanged between the monitoring server 130 and the camera 110 is encoded to protect against interception by an adverse third party.

The monitoring server 130 can be, for example, a remote monitoring server of the property monitoring system 100. The monitoring server 130 can include one or more computer systems, server systems, or other computing devices that are located remotely from the property 102 and that are configured to process information related to the property monitoring system 100 at the property 102. In some examples, the monitoring server 130 is a cloud computing platform. Although the monitoring server 130 shown in FIG. 1 receives image data from one camera, the server 130 can receive image data from any number of cameras at the property 102, and can receive image data from cameras at any number of properties.

FIG. 1 illustrates a robot 120 approaching the property 102. The robot 120 can be any type of automated device that is capable of movement. The robot 120 may be owned and/or operated by a delivery service. The robot 120 can be used to deliver items to the property 102. The robot 120 can navigate to the property 102 based on automated control technology and/or user input control provided by a user. The robot 120 can have one or more movement capabilities. For example, the robot 120 may be able to move by flying, rolling, walking, climbing stairs, hopping, slithering, swimming, etc. In the example shown in FIG. 1, the robot 120 is a wheeled robot with an ability to roll.

In some examples, the robot 120 may include data capture and recording devices. For example, the robot 120 may include one or more cameras, one or more motion sensors, and/or one or more microphones. In some examples, the robot 120 may include a communication module. The communication module can enable the robot 120 to communicate with, for example, a GPS satellite system, the monitoring server 130, the camera 110, other robots, and other devices. The communication module can be a wireless communication module that allows the robot 120 to communicate wirelessly.

The robot 120 can include sensors and control processors that guide movement of the robot 120. The control processors can process output from the various sensors and control the robot 120 to move toward a desired destination and avoid obstacles. The robot 120 may be guided to a location of the property 102 using for example, GPS navigation. The GPS navigation may direct the robot 120 to move to a latitude and longitude that corresponds to an address of the property 102. Using GPS navigation, the robot 120 may approach the property 102 via an avenue such as a street 122, an alley, a sidewalk, etc.

Once the robot 120 arrives at the location of the property 102, GPS navigation may not be sufficient to guide the robot 120 from the street 122 to a delivery drop-off point, e.g., the door 115, or to a secondary drop-off point 104. For example, terrain between the street 122 and the door 115 may include obstacles. Obstacles can include permanent obstacles, e.g., stairs, hills, fences, rocks, and vegetation. Obstacles can also include temporary obstacles, e.g., vehicles, people, pets, and lawn equipment. GPS navigation and other robot guidance systems may be insufficient to guide the robot 120 around the obstacles.

In some examples, the exact location of the door 115 in relation to the street 122 and the property 102 may be unknown to the robot 120. Additionally, the door 115 may not be visible by a camera of the robot 120 when the robot 120 is on the street 122. For example, the door 115 may be located at a side or rear of the property 102, in relation to the street 122. If the exact location of the door 115 is unknown, GPS navigation may be insufficient to guide the robot 120 to the door 115.

In some examples, GPS navigation may not be accurate enough to guide the robot 120 from the street 122 to the door 115. For example, GPS navigation may be accurate to a range of several meters, e.g., 4 meters, 7 meters, or 10 meters. The desired delivery accuracy range to the door 115 may be, for example, 1 meter or 2 meters. Therefore, even if the precise location of the door 115 is known, GPS navigation may not be sufficiently accurate to guide the robot 120 to the door 115 within the desired accuracy.

Remote camera-assisted robot guidance can be used to guide the robot 120 from the street 122 to the door 115. The camera 110 can collect images of the robot 120 and send the images to the monitoring server 130. Based on the images, the monitoring server 130 can select an appropriate path to the door 115 from a selection of stored candidate paths 140. The monitoring server 130 can provide guidance to the robot 120 for following the selected path.

FIG. 1 illustrates a flow of data, shown as stages (A) to (D), which can represent steps in an example process. Stages (A) to (D) may occur in the illustrated sequence, or in a sequence that is different from the illustrated sequence. For example, some of the stages may occur concurrently. The example illustrated in FIG. 1 includes one camera 110 and one robot 120. However, some examples can include additional cameras and/or robots.

In stage (A) of FIG. 1, a camera 110 captures robot image data and transmits the robot image data to the monitoring server 130. The robot image data can include images captured by the camera 110 and generated from any appropriate type of light. For example, the images can be generated from any combination of visible light, IR light, or UV light. The images can also be generated from RADAR, LIDAR, and/or microwave imaging. The robot image data can include any combination of still images of the robot 120, recorded video of the robot 120, or live-streamed video of the robot 120.

The robot image data can include video analysis results. For example, the camera 110 may perform video analysis, e.g., object detection, object recognition, event detection, etc. The camera 110 can send the results of the video analysis to the monitoring server 130. In some examples, the camera 110 can send the robot image data to the server 130, for example, in response to detecting the robot using object detection.

In some examples, the camera 110 can identify and/or recognize the robot 120 using video analysis. For example, the camera 110 may be pre-trained to recognize various robots using a set of known delivery robot images. When the robot 120 enters the field of view 118, the camera 110 may recognize the robot 120 as a known delivery robot. The camera 110 can send images of the robot 120 to the monitoring server 130. The camera 110 can also send a message to the monitoring server 130 indicating the detection and recognition of the robot 120.

In some examples, the camera 110 can detect and recognize the robot 120 based on transmitted and received wireless signals. For example, the robot 120 may broadcast a specific radio frequency through the communication module. In some examples, the robot may broadcast the radio frequency continuously. In some examples, the robot 120 broadcasts the radio frequency only after the robot 120 has arrived at or near the property 102. The camera 110 can include a receiver for receiving radio signals. The camera 110 can be programmed to recognize the specific radio frequency as corresponding to the robot 120. The camera 110 can then detect the robot 120 based on recognizing the specific broadcasted radio frequency. In some examples, the camera 110 may continuously listen for the specific frequency. In some examples, the camera 110 may listen for the specific frequency only when a delivery is expected. In some examples, the camera 110 can broadcast a specific radio frequency, and the robot 120 can be programmed to search for the specific frequency as the robot 120 approaches the property 102.

In some examples, upon detecting the robot 120, the camera 110 may open up a communication channel directly between the camera 110 and the robot 120. The communication channel can include any type of wireless communication between the camera 110 and the robot 120.

In some examples, the robot 120 may communicate directly with the monitoring server 130, e.g., via a long-range data link. For example, upon arriving at or near the property 102, the robot 120 may send a message to the monitoring server 130 indicating the arrival of the robot 120. In some examples, upon receiving the message, the monitoring server 130 may verify the robot 120.

In some examples, the monitoring server 130 may verify credentials of the robot 120 by performing a code verification with a third party server, e.g., a delivery service server. For example, the third party server may store a verification code for the robot 120. Upon arrival at the property 102, the robot 120 may send the verification code to the monitoring server 130. The monitoring server 130 may then send the verification code to the third party server. The third party server can determine that the verification code received from the monitoring server 130 matches the stored verification code. The third party server can then respond to the monitoring server 130 that the robot 120 is verified.

In some examples, the monitoring server 130 may verify credentials of the robot 120 by performing image verification with the third party server. For example, the third party server may store verification images of the robot 120. Upon arrival at the property 102, the camera 110 may capture an image of the robot 120 and send the image to monitoring server 130. The monitoring server 130 may then send the image to the third party server. The third party server can determine that the image of the robot 120 received from the monitoring server 130 matches the stored verification images. The third party server can then respond to the monitoring server 130 that the robot 120 is verified.

In some examples, the monitoring server 130 can maintain a schedule of expected deliveries and can correlate robot arrivals with the expected deliveries. In some examples, the schedule may be provided by the resident, e.g., through an internet website or mobile application interface. In some examples, the schedule may be provided by an owner or operator of the robot 120, e.g., by a delivery service. When the robot 120 arrives at the property 102, the monitoring server 130 may detect the robot's arrival based on, e.g., receiving a message from the robot 120 or receiving robot image data of the robot 120 from the camera 110. The monitoring server 130 may compare the robot's time of arrival with the schedule of expected deliveries to determine an identity of the robot 120. For example, a package delivery may be scheduled from a delivery company for a certain time of day. When the robot 120 arrives at the certain time of day, the monitoring system can determine that the robot 120 is from the delivery company, based on the schedule of expected deliveries.

In some examples, the monitoring server 130 can verify credentials of the robot 120 using a combination of code verification, image verification, and schedule correlation. In some examples, the monitoring server 130 or the camera 110 may store the verification code and the verification images of the robot 120 instead of, or in addition to, the third party server. In some examples, the camera 110 may maintain the schedule of expected deliveries instead of, or in addition to, the monitoring server 130.

In stage (B) of FIG. 1, the robot 120 sends a robot capability to the monitoring server 130. The robot capability can include a method of movement of the robot. For example, the robot 120 sends a robot capability of "wheels" to the monitoring server 130. The robot capability "wheels" indicates that the robot 120 has wheels 108 and is able to move by rolling. The robot capability "wheels" may also indicate that the robot is not capable of climbing stairs, and may not be capable of overcoming certain obstacles, e.g., large rocks or vegetation. In addition to the robot capability "wheels," the robot 120 can send additional capability details. For example, the robot 120 may send information to the monitoring server 130 indicating that the robot 120 is capable of rolling uphill and downhill, over terrains that include grass, pavement, or gravel.

The robot 120 may send information to the monitoring server 130 and/or the camera 110 related to the identification of the robot 120. For example, the robot 120 may send an image of the robot 120 to the camera 110 in order to assist the camera 110 in recognizing the robot 120. In some examples, the robot 120 may send authentication information, e.g., an access code, to the monitoring server 130. Based on receiving the authentication information, the monitoring server 130 can determine a level of information access of the robot 120.

Upon verifying the robot 120, the monitoring server 130 may access settings of a user, e.g., a resident of the property 102. For example, the monitoring server 130 may access a number of preferences and permissions set by the user. Preferences can include, for example, a preferred drop-off point for the delivery. The preferences may be specific to the access level of the robot 120, the time of day, the day of week, the weather, the type of delivery, etc. For example, a first set of preferences may apply to a food delivery, a second set of preferences may apply to a paper goods delivery, and a third set of preferences may apply to a valuable item delivery.

In some examples, user settings may include that certain deliveries require human retrieval. For example, a user may input preferences indicating that for a food delivery or valuable item delivery, the robot 120 should not depart the property 102 until a human retrieves the package. The robot 120 may determine that a human has retrieved a package, e.g., using one or more data capture and recording devices of the robot, e.g., a camera, motion sensor, or microphone.

In some examples, the camera 110 can determine that a human has retrieved the package based on video analysis of captured images. The camera 110 can then send a message to the robot 120 that the package has been retrieved and/or that the robot 120 is permitted to depart the property 102. In some examples, the camera 110 can determine that the human retrieving the package is an authorized user, e.g., a resident of the property 102. The camera 110 may determine that the human is an authorized user, for example, by performing facial recognition analysis on images of the human.

In some examples, the camera 110 can monitor the robot 120 and the package for indications of interference. For example, the camera 110 can perform video analysis on images of the robot 120 to determine if an unknown person is following the robot 120 or otherwise interfering with the robot 120. In response to determining that a person is interfering with the robot 120, the camera 110 may perform one or more actions. For example, the camera 110 may send a command to the robot 120 to activate an audible alarm and/or to wait to deliver the package until the person departs the scene. In another example, the camera 110 may send a notification to the residents indicating potential interference with the delivery, may sound an alarm at the property 102, and/or may lock the door 115.

In some examples, the robot 120 may determine that a person is interfering with the delivery. For example, a person may follow the robot 120, attempt to take the package from the robot 120, or block a path of the robot 120. The robot 120 may send a distress signal to the camera 110 in response to determining that the person is interfering with the delivery. In response to receiving the distress signal, the camera 110 may take one or more actions. For example, the camera 110 may send a notification to the residents, may record video of the interference for uploading to the monitoring server 130, and/or may sound an alarm at the property 102.

In some examples, a high-level access code may allow the robot 120 to access secure areas of the property 102, e.g., a garage, a screened-in porch, or a fenced area, in order to deliver a package. In response to receiving the high-level access code, the monitoring server 130 can send guidance to the robot 120 directing the robot 120 to the secure area, and can enable access to the secure area. For example, the monitoring server 130 can send guidance to the robot 120 directing the robot 120 to the garage, and can send a command to a control panel of the property 102 to open the garage door. In contrast, a low-level access code may only allow the robot 120 to approach the front door 115 of the property 102. In response to receiving the low-level access code, the monitoring server 130 can send guidance to the robot 120 directing the robot 120 to the door 115.

In some examples, the robot 120 can send additional information, e.g., related to a package to be delivered, to the monitoring server 130, to the camera 110, or both. Package information can include, for example, a package size, shape, weight, appearance, etc. Package information can also include a value of the package and a fragility of the package. The monitoring server 130 may determine a drop-off location based on the package information, e.g., based on pre-programmed settings and preferences. For example, a pre-programmed setting may state that packages with a value over a certain dollar amount should be delivered to a garage, while packages with a value below the certain dollar amount should be delivered to the front door.

Stages (A) and (B) of FIG. 1 may be independent from one another and can occur at the same time or at different times. In some examples, the monitoring server 130 may receive robot image data from the camera 110, but may not receive a robot capability from the robot 120. In some examples, the monitoring server 130 may receive a robot capability from the robot 120, but may not receive robot image data from the camera 110.

In stage (C) of FIG. 1, the monitoring server 130 selects a path based on the robot image data and the robot capability. The monitoring server 130 can select the path from a selection of one or more candidate paths 140. The candidate paths 140 can be stored, e.g., by the monitoring server 130, or in a database that can be accessed by the monitoring server 130. Generation and storage of the candidate paths 140 is described in greater detail with reference to FIG. 2. The candidate paths 140 include a staircase path 114 and a ramp path 116.

The monitoring server 130 receives the robot capability "wheels," indicating that the robot 120 has wheels 108. The monitoring server 130 receives the robot image data including images of the robot 120. Based on video analysis of the images, the monitoring server 130 can confirm that the robot 120 has wheels 108. Additionally, based on video analysis of the images, the monitoring server 130 can determine additional characteristics of the robot 120, e.g., a size of the wheels 108, a type of tread of the wheels 108, a size of the robot 120, an orientation of the robot 120, etc. Based on the robot image data, the monitoring server 130 may determine that the robot 120 is capable of traversing the ramp path 116. Therefore, based on the robot capability "wheels," and the robot image data, the monitoring server 130 selects the ramp path 116.

In some examples, the monitoring server 130 can analyze and consider additional data in the selection of the candidate path 140. For example, the monitoring server 130 may access weather data, e.g., from the internet or from one or more sensors at the property 102, indicating rainy weather conditions at the property 102. The monitoring server 130 may receive data from the robot 120 indicating a heavy weight of the robot. The monitoring server 130 may analyze the robot image data and determine that the wheels 108 are small, with smooth tread. Based on the rainy weather conditions, the heavy weight, and the smooth tread, the monitoring server 130 may determine that the ramp path 116 is likely muddy, and that the robot 120 is likely incapable of traversing the ramp path 116 without becoming stuck. Based on the robot capability "wheels," the monitoring server 130 determines that the robot 120 is incapable of traversing the staircase path 114. In response to determining that the robot 120 is incapable of traversing any of the candidate paths 140 to the door 115, the monitoring server 130 can determine a drop-off point, e.g., the secondary drop-off point 104, that is different from the door 115.

In stage (D) of FIG. 1, the monitoring server 130 sends path guidance to the robot 120. The monitoring server 130 can send the path guidance to the robot 120, e.g., over a long-range data link.

In some examples, the path guidance can include a model of the environment. The model of the environment can include a terrain model of the path 116, including any obstacles along the path 116. The model of the environment can include navigational landmarks along the path 116, e.g., bends in the path 116, vegetation along the path 116, etc. Upon receiving the model from the monitoring server 130, the robot 120 can navigate to the door 115 along the path 116 based on the model. The model can be a private model that the monitoring server 130 sends in response to receiving authentication from the robot 120. The model can be maintained up-to-date, e.g., based on images of the path 116 collected by the camera 110 over time.

In some examples, the monitoring server 130 can send step-by-step guidance to the robot 120. The monitoring server 130 can provide the commands in real time based on the robot image data. For example, the camera 110 can capture images of the robot 120 following the path 116. The camera 110 can send the images to the monitoring server 130. Based on the images, the monitoring server 130 can determine if the robot 120 is on track, or if the robot 120 requires additional guidance. Guidance can include real-time commands, e.g., "rotate to the left . . . stop . . . move forward . . . stop . . . rotate to the right."

In some examples, the monitoring server 130 can send prescribed directions to the robot 120 based on the model of the environment. The prescribed directions can direct the robot to move a specified distance, turn to a certain direction, etc. An example set of prescribed directions can be, "from the street, proceed five feet northeast, then turn twenty-three degrees clockwise, then proceed two feet, then stop." In some examples, the prescribed directions can include a series of GPS-coordinate waypoints.

In some examples, in addition to or instead of the monitoring server 130, the camera 110 can send guidance to the robot. The guidance from the camera 110 can include real-time commands, as described above. In some examples, guidance from the camera 110 can include a homing beacon emitted by the camera 110. The homing beacon can emit, for example, infrared energy or radio energy. The robot 120 can include sensors to detect the emitted energy and determine a source direction of the emitted energy. Based on the source direction of the emitted energy, the robot 120 can navigate to the homing beacon. The robot 120 can navigate to the homing beacon, e.g., based on the model of the environment, based on sensor data collected from sensors of the robot 120, or both.

In some examples, guidance from the camera 110 can include a light projection. For example, the camera 110 can include a light projecting device, e.g., a laser projector, Digital Light Processor (DLP) projector, Liquid Crystal Display (LCD) projector, etc. The camera 110 can instruct one or more projectors to project optical patterns (e.g., points, shapes, texts, graphics, etc.) onto a surface such as a ground of the property 102 to guide the robot 120 to the drop-off point. The projectors may coordinate with the camera 110 in order to accurately track the robot 120 and project the optical patterns based on a location of the robot 120. Each projector may be capable of displaying multiple different types of optical patterns and projecting the optical patterns with a laser, focused light, infrared light, flood light, and other lighting sources. In some examples, the optical patterns can indicate a path for the robot 120 to follow. In some examples, the optical patterns can indicate obstacles for the robot 120 to avoid. The projecting device may be integrated within the camera 110, or may be separate from the camera.

In some examples, the camera 110 can capture images of the robot 120 and can provide positive feedback and negative feedback to the robot 120 based on movement of the robot 120. For example, if the camera 110 detects the robot 120 moving toward the camera 110, the camera 110 can send positive feedback to the robot 120, indicating that the robot 120 should continue in the same direction. If the camera 110 detects the robot 120 moving away from the camera 110, the camera 110 can send negative feedback to the robot 120, indicating that the robot 120 should change course.

In some examples, the camera 110 can stream images to the robot 120. Images of the path 116 within the field of view 118 of the camera 110 may be broader than images of the path 116 that are observable by sensors of the robot 120. For example, the camera 110 may be installed at a higher elevation than a camera that is installed on the robot 120. Thus, streaming images to the robot 120 may provide the robot 120 with an additional, broader perspective view of the path 116. Streaming images to the robot 120 can also provide the robot 120 with a view of the robot 120 on or near the path 116. Based on the images, the robot 120 can determine whether its movements are along the path 116, and whether its direction of movement is toward, away from, or parallel to the camera 110. Based on the images, the robot 120 can also determine if the robot 120 is approaching an obstacle that may not be visible by sensors of the robot 120.

In some examples, the robot 120 can transfer maneuvering control to the monitoring server 130 or the camera 110. For example, the robot 120 may provide access to a control application programming interface (API) of the robot 120. The robot 120 can then be controlled remotely by the monitoring server 130 or the camera 110.

In some examples, the monitoring server 130, the camera 110, or both, can send a combination of path guidance to the robot 120. For example, the monitoring server 130 can send the model of the environment to the robot 120, the camera 110 can emit a homing beacon, and the monitoring server 130 can provide real-time commands to the robot 120. In some examples, the monitoring server 130 can send prescribed directions to the robot 120, and the camera 110 can monitor the robot's progress along the path 116. The camera 110 can then provide real-time commands to the robot 120 as needed, e.g., if the motion of the robot 120 diverges from the path 116.

In some examples, the monitoring server 130 and/or the camera 110 can send a signal to the robot 120 when the robot 120 reaches the drop-off point, e.g., the door 115 or the secondary drop-off point 104. In response to receiving the signal, the robot 120 can drop off the package at the drop-off point. Upon delivery of the package, the camera 110, the robot 120, or both, may capture an image of the package at the drop-off point. In some examples, the camera 110 can send a confirmation message to the robot 120, to the monitoring server 130, and/or to a mobile device of the resident, indicating that the package has been received at the designated drop-off point. The confirmation message may include the location of the drop-off point, e.g., "front porch," and an image of the package at the drop-off point. The camera 110 can then monitor and track the package using video analysis until the package is picked up by a resident of the property 102.

In some examples, the property monitoring system 100 may include a drone 106. The drone 106 can be a component of the property monitoring system 100 that can maneuver around the property 102, collect sensor data, e.g., camera images, from various areas of the property 102, and perform various actions as commanded by the monitoring server 130, the camera 110, a control unit, or another device. The drone may be used to assist the robot 120 with a delivery.

In some examples, upon detecting the robot 120 within the field of view 118, the camera 110 can send guidance to the drone 106, directing the drone 106 to the detected position of the robot 120. To assist with the delivery, the drone 106 can maneuver along the path 116, while the robot 120 follows the drone 106. The robot 120 can receive instructions to follow the drone from, e.g., the monitoring server 130, the camera 110, or the drone 106. The drone 106 can follow the path 116 based on guidance provided by the camera 110, or based on pre-programmed prescribed guidance.

In some examples, to assist with the delivery, the drone 106 can retrieve the package from the robot 120. The drone 106 can then deliver the package to the drop-off point. In some examples, the drone 106 may retrieve the package from the robot 120 if the robot 120 is not able to reach the drop-off point. For example, the monitoring server 130 may determine that the robot 120 is incapable of traversing any of the candidate paths to the drop-off point. The monitoring server 130 may then send a command to the drone 106 to retrieve the package from the robot 120.

In some examples, the drone 106 may retrieve the package from the robot 120 in order to deliver the package to a secure area of the property 102. For example, the drone 106 may have access to areas of the property 102 that the robot 120 does not have access to. The programmed preferences and settings may indicate that it is preferable for the drone 106 to retrieve and deliver the package to a secure area, than for the robot 120 to be granted access to the secure area.

In some examples, to assist with the delivery, the drone 106 can send commands to the robot 120. The drone 106 can track movement of the robot 120 using one or more sensors, e.g., a camera, and can provide real-time commands to the robot 120 for movement of the robot 120.

In some examples, the property monitoring system 100 may perform one or more actions in response to detecting the robot 120. For example, upon detecting and verifying the robot 120, the monitoring server 130 may send a command to one or more devices of the property monitoring system 100 to disable alerts based on actions of the robot 120. For example, the camera 110 may be configured to generate an alert in response to any detected object approaching within a threshold range to the door 115. Once the monitoring server 130 verifies that the object is the robot 120, the camera 110 can disable generation of the alert.

In some examples, upon detecting and verifying the robot 120, the monitoring server 130 can send commands to adjust settings of various devices and components of the property monitoring system 100. For example, the monitoring server 130 can send a command to a sprinkler system to deactivate sprinkling while the delivery is in progress. The monitoring server 130 can also send a command to turn on outdoor lights at the property 102, to open certain gates and doors of the property 102, and to activate additional sensors, e.g., microphones and motion sensors.

In some examples, upon detecting and verifying the robot 120, the monitoring server 130 may send a notification to a resident of the property 102. For example, the notification may state that a robotic delivery is in progress. The monitoring server 130 may send the notification, e.g., to a control panel of the property monitoring system 100, to a mobile device of the resident, or both.

In some examples, during a robotic delivery, the monitoring server 130 can perform certain actions when the property 102 is occupied, and certain other actions when the property 102 is unoccupied. For example, the monitoring server 130 may select a different drop-off point when the property 102 is occupied, than when the property 102 is unoccupied. The monitoring server 130 can determine whether the property 102 is occupied based on, for example, motion sensor data, monitoring system status settings, and surveillance camera images.

After the robot 120 delivers the package, the camera 110, the monitoring server 130, and/or the drone 106 can provide guidance to the robot 120 to depart the property 102. The methods for guiding the robot 120 to depart the property 102 can be the same as or similar to the methods used to guide the robot 120 to the drop-off point. Once the robot 120 departs the property 102, e.g., upon reaching the street 122, the robot 120 can cease communications with the monitoring server 130 and the camera 110.

In some examples, the monitoring server 130 may collect data from multiple cameras. The multiple cameras may be installed at multiple properties within a local area such as a neighborhood. The monitoring server may analyze image data from the multiple cameras to detect arrival of the robot 120 in the neighborhood.

In some examples, the robot 120 may be detected by a first camera in the neighborhood that is installed at a property other than the property 102. Upon detection of the robot 120 by the first camera, the monitoring server 130 can send guidance commands to the robot 120 via the first camera, guiding the robot 120 toward the property 102. The robot 120 may pass from a field of view of the first camera to a field of view of a second camera in the neighborhood. The monitoring server 130 can then send guidance commands to the robot 120 via the second camera. The cameras in the neighborhood can continue to "hand off" guidance of the robot 120 to each other, until the robot 120 arrives at the property 102.

Providing guidance to the robot 120 via multiple cameras in a local area can enable the robot 120 to navigate to a property that may be located in an area with poor or inaccurate GPS mapping. Providing guidance to the robot 120 via multiple cameras in a local area can also enable the robot 120 to navigate to a property that does not have an installed camera, but that is located near other properties that have cameras.

In some examples, the camera 110 and/or cameras in the local area can be used to guide the robot 120 to a robot charging station. For example, a charging station may be installed external to the property 102. Upon arrival at the property 102, the robot 120 may transmit a power level status to the camera 110 and/or may transmit a "low power" signal to the camera 110. The camera 110 can send commands to the robot 120 to guide the robot 120 to the charging station at the property 102. In some examples, the camera 110 or other cameras in the local area can send commands to the robot 120 to guide the robot 120 to a nearby public charging system.

Though described above as being performed by a particular component of the property monitoring systems 100 (e.g., the camera 110 or the monitoring server 130), any of the various control, processing, and analysis operations can be performed by either the camera 110, the monitoring server 130, or another computer system of the property monitoring system 100. For example, the system 100 may include a control unit at the property 102. The control unit may be configured to monitor and control various sensors and devices at the property 102. The control unit may communicate with the camera 110 and other sensors over a wireless network at the property 102. The control unit, the monitoring server 130, the camera 110, or another computer system can communicate with the robot 120, e.g., to receive a robot capability, to send path guidance, etc.

Figure 2:
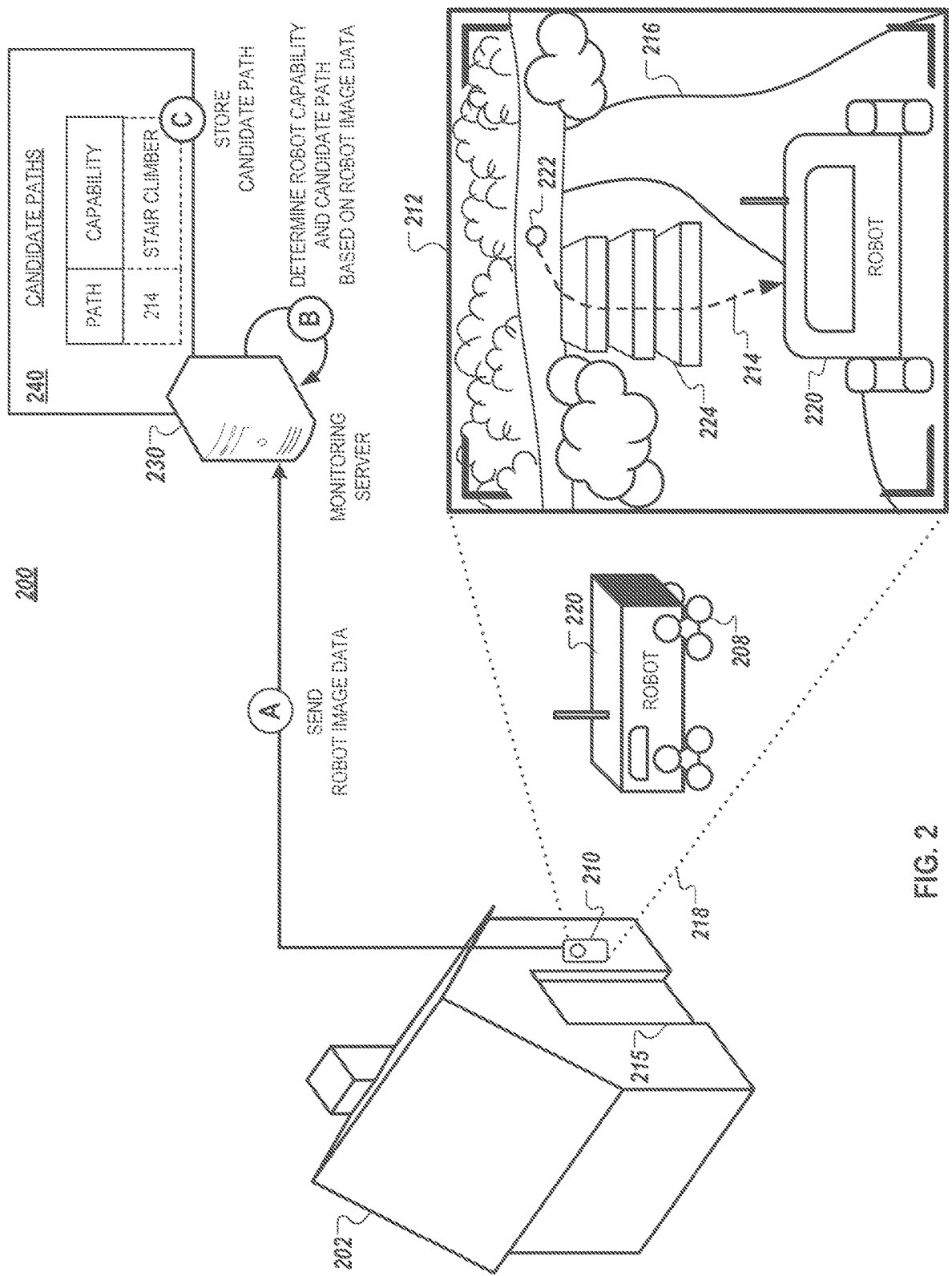
FIG. 2 illustrates an example system for generating and storing candidate paths.

FIG. 2 illustrates an example property monitoring system 200 for generating and storing candidate paths 240. The monitoring system 200 generates and stores the candidate paths 240 for guiding a robot 220 to a drop-off point at a property 202.

The system 200 includes the property 202 monitored by the monitoring system 200. A camera 210 is installed at the property 202. The camera 210 is installed external to the property 202. The camera 210 is installed near a door 215, facing a yard of the property 202.

FIG. 2 illustrates a robot 220 approaching the property 202. The robot 220 may be an automated device that is capable of movement. For example, the robot 220 may be a wheeled vehicle, a vehicle with treads, or a bipedal device. The robot 220 can be used to deliver items to the property 202. The robot 220 can navigate to the property 202 based on automated control technology and/or user input control provided by a user. The robot 220 may be able to fly, roll, walk, climb stairs, or otherwise move.

In the example shown in FIG. 2, the robot 220 is a stair-climbing robot. The robot 220 includes stair-climbing feet 208 that enable the robot 220 to ascend and descend stairs. The robot 220 approaches the door 215 without receiving guidance from the property monitoring system 200. The camera 210 and the monitoring server 230 monitor movements of the robot 220 to generate a candidate path 240 that can be used to guide other robots.

FIG. 2 illustrates a flow of data, shown as stages (A) to (C), which can represent steps in an example process. Stages (A) to (C) may occur in the illustrated sequence, or in a sequence that is different from the illustrated sequence. For example, some of the stages may occur concurrently.

In stage (A) of FIG. 2, the camera 210 captures robot image data and sends the robot image data to the monitoring server 230. In some examples, the camera 210 can send the robot image data to the monitoring server 230 in response to detecting the robot 220 within a field of view 218. The image data can include any combination of still images of the robot 220, recorded video of the robot 220, or live-streamed video of the robot 220.

Image 212 is an example image sent by the camera 210 to the monitoring server 230. The image 212 can represent a video captured by the camera 210. The video captured by the camera 210 shows the robot 220 beginning at a starting point 222. The robot 220 approaches the camera 210 by descending a staircase 224. The route traveled by the robot 220 forms a path 214. The robot 220 does not follow walkway path 216, which includes a downhill slope.

In stage (B) of FIG. 2, the monitoring server 230 determines a robot capability and a candidate path based on the robot image data. The monitoring server 230, the camera 210, or both, can perform video analysis on the image 212 and other images captured by the camera 210. Based on the video analysis, the monitoring server 230 can determine a capability of the robot 220. For example, the monitoring server 230 can identify the stair-climbing feet 208 of the robot 220. In some examples, the monitoring server 230 may be able to recognize the stair-climbing feet 208 based on training images including various types of known robots. The monitoring server 230 can assign a capability "stair climber" to the robot 220.

In some examples, the monitoring server 230 may determine the robot capability and the candidate path based on receiving capability information from the robot 220. The monitoring server 230 may verify the capability information received from the robot 220 based on video analysis of the robot image data.

The monitoring server 230 can analyze the video captured by the camera 210 to determine the path taken by the robot 220. The monitoring server 230 can determine that the robot 220 traversed the staircase 224 along a path 214. In some examples, the monitoring server 230 can determine a success level of the robot 220 in traversing the path 214. For example, the monitoring server 230 can determine if the robot 220 paused at any point along the path 214. The monitoring server 230 can also determine if the robot 220 successfully arrived at the door 215, or if the robot 220 retreated before arriving at the door 215.

In stage (C) of FIG. 2, the monitoring server 230 stores the candidate path. For example, the monitoring server 230 can determine that the robot 220 successfully traversed the path 214 and arrived at the door 215. Based on determining that the robot 220 successfully traversed the path 214, the monitoring server 230 can store the path 214 as a candidate path 240.

The path 214 can be labeled with a capability of the robot 220. Based on the video analysis, the monitoring server 230 determines that the robot 220 has an ability to climb stairs, and can store the path 214 labeled with the capability "stair climber."

In some examples, in addition to or instead of generating candidate paths 240 based on video analysis of robot image data, the monitoring server 230 and/or the camera 210 can use other methods for generating candidate paths 240.

In some examples, a resident can provide a candidate path 240, e.g., through an application on a computing device. For example, the resident can draw one or more paths to the door 215 on a map of the property 102 provided through the application. In some examples, the resident can walk a path while recording the path using a mobile device, e.g., a smart phone. For example, the resident can activate a GPS tracker on the mobile device and carry the mobile device while walking the path. The smart phone can record the GPS coordinates of the path. The smart phone can then upload the GPS coordinates of the path to the monitoring server 230, and the monitoring server 230 can store the path as a candidate path 240.

In some examples, the resident can record the path using a camera of a mobile device. For example, the resident can activate the camera and walk the path while carrying the mobile device, using the camera to the path from the resident's perspective view. The smart phone can then upload the video recording of the candidate path to the monitoring server 230. The monitoring server 230 can store the recorded path as a candidate path 240.

In some examples, the resident can provide a candidate path 240 using the remote camera 210. For example, the resident can initiate recording by the camera 210 through an application on a mobile device, or through an interface of a control panel of the property monitoring system. The camera 210 can then record the resident while the resident approaches the door 215. Once the resident reaches the door 215, the camera 210 can upload the recorded path to the monitoring server 230. The monitoring server 230 can store the recorded path as a candidate path 240.

In some implementations, upon installation, the camera 210 may have a training phase. For example, the training phase may be a period of multiple days or weeks. During the training phase, the camera 210 can record all approaches to the door 215, including approaches by both robots and humans. The monitoring server 230 can store the recorded approaches as candidate paths 240. The monitoring server 230 can also evaluate the success level of each candidate path. For example, the monitoring server 230 may determine that robots with wheels successfully reach the door 215 ten percent of the time when following the path 214, while robots with wheels successfully reach the door 215 eighty percent of the time when following the path 216. If the success level exceeds a programmed threshold, e.g., seventy percent, the monitoring server 230 can store the candidate path 216 labeled with the associated capability that resulted in the success level exceeding the programmed threshold. For example, the monitoring server 230 can store the path 216 labeled with the capability "wheels," based on the success level of eighty percent exceeding the programmed threshold of seventy percent. In this way, during the training phase, the camera 210 and the monitoring server 230 can be fine-tuned to the specific installation location.

In some examples, in addition to or instead of the training phase, the camera 210 and the monitoring server 230 can continuously generate and store candidate paths 240 while in operation. The camera 210 may record and analyze all approaches, or a selection of approaches. For example, the camera 210 may record and analyze all approaches made by robots, all approaches made by humans, or all approaches made by both robots and humans. Each successful approach to the door can be stored as a candidate path 240.

In some examples, over time, the monitoring server 230 may prioritize the candidate paths 240 based on success levels. In some examples, the monitoring server 230 may remove candidate paths 240 based on evaluating success levels of each candidate path 240. For example, if an average success level of a certain candidate path 240 falls below a programmed threshold success level, the monitoring server 230 may remove the candidate path 240 from the selection of candidate paths 240.

Though described above as being performed by a particular component of the systems 200 (e.g., the camera 210 or the monitoring server 230), any of the various control, processing, and analysis operations can be performed by either the camera 210, the monitoring server 230, or another computer system of the system 200. For example, the system 200 may include a control unit at the property 202. The control unit may be configured to monitor and control various sensors and devices at the property 202. The control unit may communicate with the camera 210 and other sensors over a wireless network at the property 202. The control unit, the camera 210, or another computer system can communicate with the monitoring server 130, e.g., to send robot image data.

Figure 3:
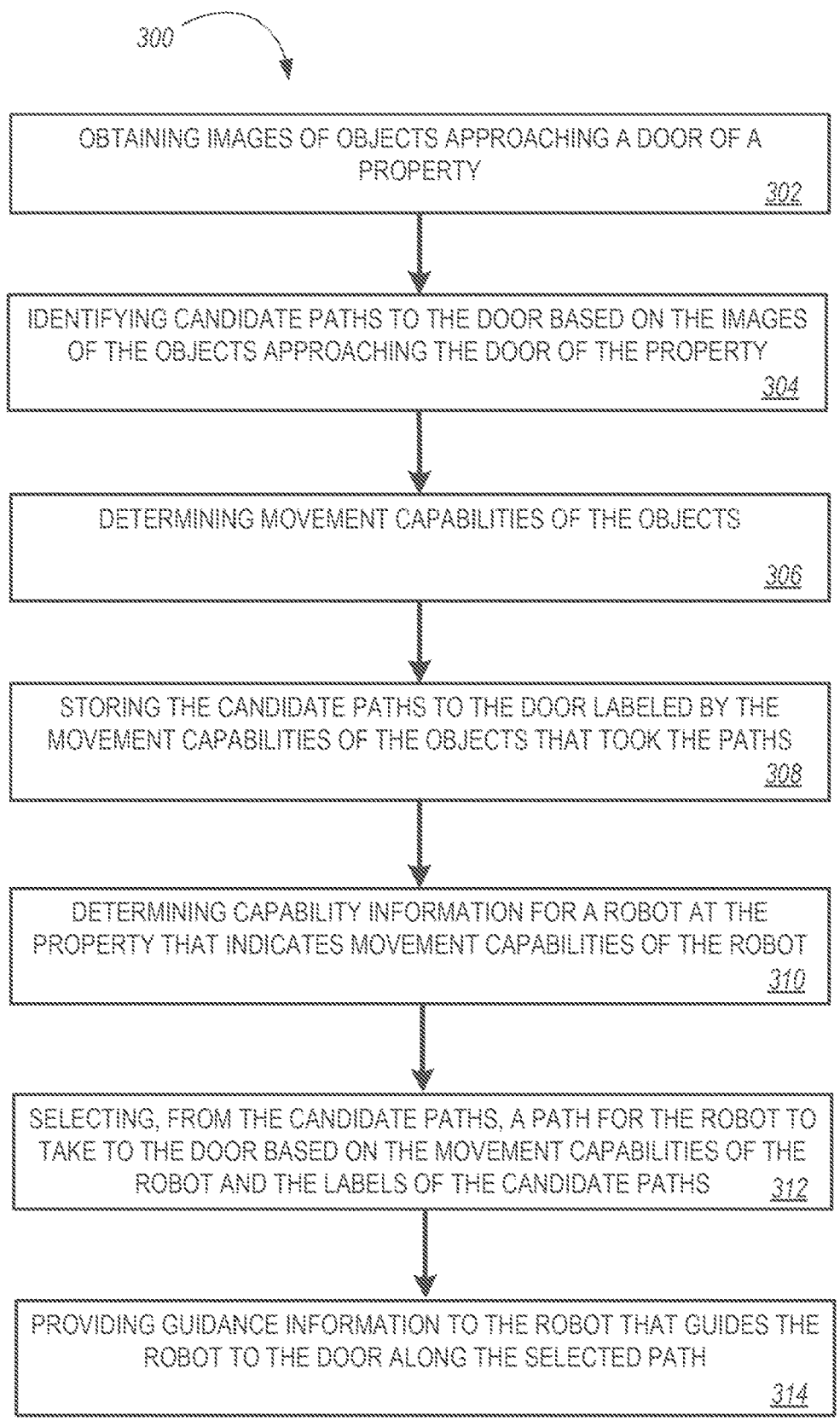
FIG. 3 is a flow diagram of an example process for remote camera-assisted robot guidance.

FIG. 3 is a flow diagram of an example process 300 for camera-assisted robot guidance. The process 300 can be performed by a computing system of the monitoring system 100, e.g., the monitoring server 130, the camera 110, or a control unit. In some examples, some steps of the process 300 are performed by one computing system, e.g., the camera 110, and other steps of the process 300 are performed by another computing system, e.g., the monitoring server 130. Briefly, the process 300 includes obtaining images of objects approaching a door of a property (302), identifying candidate paths to the door based on the images of the objects approaching the door of the property (304), determining movement capabilities of the objects (306), storing the candidate paths to the door labeled by the movement capabilities of the objects that took the paths (308), determining capability information from a robot at the property that indicates movement capabilities of the robot (310), selecting, from the candidate paths, a path for the robot to take to the door based on the movement capabilities of the robot and the labels of the candidate paths (312), and providing guidance information to the robot that guides the robot to the door along the selected path (314).

In additional detail, the process 300 includes obtaining images of objects approaching a door of a property (302). For example, the camera 110 may capture images of objects, e.g., robots, humans, etc., approaching the door 115 of the property 102. The objects may approach the door 115, for example, via a ramp or via a staircase. The camera 110 can send the images of the objects to the monitoring server 130.

The process 300 includes identifying candidate paths to the door based on the images of the objects approaching the door of the property (304). For example, the monitoring server 130 can receive the images of the objects and analyze the images using video analysis. The monitoring server can determine that some objects approach the door 115 via the ramp, and that some objects approach the door 115 via the staircase.

In some implementations, identifying candidate paths to the door based on the images of the objects approaching the door of the property includes determining, for each object of the objects approaching the door of the property, a path that the object took to approach the door and a level of success of the object in reaching the door. For example, the images may depict a wheeled object, such as a wheelchair, approaching the door 215 of the property 202. The wheelchair may approach the door 215 by taking path 216. The system can determine a success level of 90% based on factors such as the speed at which the wheelchair approaches the door 215, the fluidity of motion of the wheelchair, the number of motion pauses, etc.

The system can determine that the level of success of the object in reaching the door meets success criteria. For example, success criteria may be a success level of 75%. Based on determining that the level of success of the object in reaching the door meets success criteria, the system can identify the path as a candidate path. For example, based on determining that the success level of 90% exceeds the success criteria of 75%, the system can identify the path 216 as a candidate path for wheeled objects.

In some examples, the success criteria may include a time of approach. For example, success criteria can include a maximum time of approach between starting point 222 and the door 215 of thirty seconds. In this example, if an object reaches the door 215 from the starting point 222 in less than thirty seconds, the system can identify the path taken by the object as a candidate path.

The process 300 includes determining movement capabilities of the objects (306). For example, the monitoring server 130 can determine movement capabilities of the objects based on analyzing the images of the objects. The monitoring server 130 may identify features of the objects in the images, e.g., wheels, wings, stair-climbing feet, etc. The monitoring server 130 may also identify features of object movement methods, e.g., rolling, flying, hopping, etc. In some implementations, the movement capabilities of the objects include at least one of a rolling capability, a stair climbing capability, a walking capability, a speed capability, or a slope traversing capability.

In some implementations, the process 300 includes determining, for each object of the objects approaching the door of the property, at least one of a movement mechanism of the object, a type of motion of the object; or a characteristic of a package carried by the object. For example, a movement mechanism can include treads, wheels, stair-climbers, legs, etc. A type of motion can include rolling, hopping, slithering, walking, etc. A characteristic of a package carried by the object can include a size, shape, fragility, or material of the package. The process 300 can include labeling the candidate path with the at least one of the movement mechanism of the object, the type of motion of the object; or the characteristic of a package carried by the object. For example, the system can determine that a person carrying a large cardboard box labeled "fragile" walked down the staircase 224. The system can label the path taken by the object with labels indicating a movement mechanism of "legs," a type of motion of "walking," and package characteristics of "large," "cardboard," and "fragile."

The process 300 includes storing the candidate paths to the door labeled by the movement capabilities of the objects that took the paths (308). For example, the monitoring server 130 may determine that objects that approach the door 115 via the ramp have wheels. The monitoring server 130 can store the ramp as path 116, labeled by the capability "wheels." The stored path 116 can include, for example, GPS coordinate waypoints, terrain information, obstacle information, etc. The stored path 116 can also include prescribed directions for guiding an object, e.g., a robot, along the path 116.

In some implementations, the process 300 includes obtaining images of second objects approaching a drop-off point at the property. The drop-off point may be remote from the door of the property. For example, the drop-off point 104 is to the side of the property 102. The process 300 can include identifying second candidate paths to the drop-off point based on the images of the second objects approaching the drop-off point. For example, on a snowy day, the system may obtain images of a child sledding from the street 122 to the drop-off point 104. The system can identify a second candidate path from the street 122 to the drop-off point 104 based on the images of the child sledding. The process 300 can include determining movement capabilities of the second objects. For example, the system can determine a movement capability of "sliding" for the sled. The process 300 can include storing the second candidate paths to the drop-off point labeled by the movement capabilities of the second objects that took the paths. For example, the system can store the second candidate path to the drop-off point 104 labeled by the movement capability of "sliding."

In some implementations, the process 300 includes determining capability information for a second robot at the property that indicates movement capabilities of the second robot. The system can determine, based on the movement capabilities of the second robot, that the second robot is not capable of taking any of the candidate paths to the door of the property. For example, the movement capabilities of the second robot may be that the robot slides on skis. Based on the movement capability of sliding on skis, the system may determine that the second robot is not capable of taking any of the candidate paths to the door of the property, e.g., because all of the candidate paths to the door of the property include a staircase. In response to determining that the second robot is not capable of taking any of the candidate paths to the door of the property, the system can select, from the second candidate paths, a path for the second robot to take to the drop-off point based on the movement capabilities of the second robot and the labels of the second candidate paths. For example, the system can select the second candidate path to the drop-off point 104 that is labeled by the movement capability of "sliding." The system can provide guidance information to the second robot that guides the second robot to the drop-off point along the selected path.

In some implementations, the drop-off point is located at a secure area of the property. For example, the drop-off point may be behind a fence or other physical barrier. In these examples, the process 300 can include receiving credential information for the robot at the property. For example, the robot may transmit a verification code to the camera 110. Based on receiving the credential information for the robot, the system can enable access for the robot to the secure area of the property. For example, based on receiving the verification code, the camera 110 can send a command to a lock to unlock a gate to the secure area. The system can select, from the second candidate paths, a path for the robot to take to the secure area of the property based on the movement capabilities of the robot and the labels of the second candidate paths and can provide guidance information to the robot that guides the robot to the secure area of the property along the selected path.

The process 300 includes determining capability information for a robot at the property that indicates movement capabilities of the robot (310). For example, the monitoring server 130 can receive capability information from the robot 120 at the property 102 that indicates movement capabilities of the robot 120. The movement capabilities can include that the robot 120 has wheels 108. The movement capabilities can also include, for example, speed capabilities, turning radius, terrain limitations, obstacle size limitations, maximum slope capabilities, and other capabilities of the robot 120. The monitoring server 130 can receive the capability information from the robot 120 over, e.g., a long-range wireless data link. In some examples, the robot 120 can send the capability information to the monitoring server 130 via wireless communication with the camera 110. The monitoring server 130 can also determine robot capabilities based on robot image data. The monitoring server 130 and/or the camera 110 can perform video analysis on images of the robot to determine capabilities of the robot 120. The monitoring server 130 may verify the capability information received from the robot 120 based on video analysis of images of the robot 120.

In some implementations, determining capability information for the robot at the property that indicates the movement capabilities of the robot includes receiving data indicating a time of arrival of the robot at the property. For example, the robot 120 may arrive at the property 102 at 10:06 am on Wednesday. The system can access a delivery schedule for the property. In some examples, the delivery schedule for the property may be stored by the monitoring server 130. In some examples, the monitoring server 130 may request the delivery schedule, e.g., from a vendor or delivery service. The delivery schedule can include, for one or more scheduled deliveries, an expected time of each delivery and capability information for the robot that is expected to bring each delivery to the property. For example, the delivery schedule may include an expected delivery by a wheeled robot at 10:00 am on Wednesday by an aerial robot at 12:00 pm on Wednesday. The system can determine, based on the delivery schedule, the delivery that corresponds to the time of arrival of the robot. For example, based on the expected delivery by a wheeled robot scheduled for 10:00 am, the system can determine that the robot 120 that has arrived at 10:06 am is the wheeled robot. Based on the delivery that corresponds to the time of arrival of the robot, the system can determine the capability information for the robot. For example, based on determining that the robot 120 is the wheeled robot, the system can determine that the wheeled robot 120 has rolling capabilities and does not have stair climbing capabilities.

In some implementations, determining capability information for the robot at the property that indicates the movement capabilities of the robot includes accessing one or more images of the robot. For example, the monitoring server 130 can access images of the robot that were captured by the camera 110. The system can analyze the one or more images of the robot and determine the capability information for the robot based on analyzing the one or more images of the robot. In some implementations, analyzing the one or more images of the robot includes identifying, in the one or more images of the robot, one or more movement mechanisms of the robot. For example, the system can analyze images of the robot to identify movement mechanisms such as wheels, skis, stair climbers, legs, wings, etc. In some implementations, analyzing the one or more images of the robot includes identifying, in the one or more images of the robot, a type of motion of the robot. For example, the system can analyze images of the robot to identify a type of motion such as rolling, walking, climbing, slithering, flying, etc.

In some implementations, determining capability information for the robot at the property that indicates the movement capabilities of the robot includes receiving, from the robot, a wireless communication indicating the capability information for the robot. For example, the robot 120 may transmit to the camera 110 a wireless communication including data indicating that the robot has wheels and is capable of rolling. The wireless communication may also include, for example, a turning radius, a maximum incline, a maximum decline, a maximum speed, and other movement capabilities of the robot.

The process 300 includes selecting, from the candidate paths, a path for the robot to take to the door based on the movement capabilities of the robot and the labels of the candidate paths (312).

In some implementations, selecting, from the candidate paths, a path for the robot to take to the door based on the movement capabilities of the robot and the labels of the candidate paths includes: based on a rolling capability of the robot, selecting, from the candidate paths that are labeled by the movement capabilities of the objects that took the paths, a path that is associated with a label indicating rolling capabilities of the objects that took the path. For example, the monitoring server 130 can select the path 116 based on the capability "wheels" of the robot 120, and the label "wheels" of the path 116.

In some implementations, selecting, from the candidate paths, a path for the robot to take based on the movement capabilities of the robot and the labels of the candidate paths includes: based on a stair climbing capability of the robot, selecting, from the candidate paths that are labeled by the movement capabilities of the objects that took the paths, a path for the robot to take that is associated with a label indicating stair-climbing capabilities of the objects that took the path. For example, the monitoring server 130 can select the path 214 based on the capability "stair climber" of the robot 220, and the label "stair climber" of the path 214.

In some implementations, based on analyzing the image of the robot, the system can determine a characteristic of a package that is carried by the robot. For example, the system may analyze the image of the robot and determine a size, shape, weight, or fragility of the package. In some implementations, the system can select, from the candidate paths, the path for the robot to take to the door based on the movement capabilities of the robot, the characteristic of the package that is being delivered by the robot, and the labels of the candidate paths. For example, based on analyzing images of the robot, the system may determine that robot having wheels and is carrying a large, heavy package. A first candidate path may have a steep downward slope, and be labeled "wheels," "light," "small." A second candidate path may have a gradual downward slope, and be labeled "wheels," "heavy," "large." A third candidate path may include stairs and be labeled "stair climber." The system can select the second candidate path based on the wheeled capability of the robot, and the characteristics of the package being large and heavy.

In some implementations, the process 300 includes receiving data indicating an environmental condition at the property. For example, the environmental condition can include a temperature, precipitation type, precipitation amount, etc. The system can select, from the candidate paths, the path for the robot to take based on the movement capabilities of the robot, the environmental condition at the property, and the labels of the candidate paths. For example, a robot may have a walking capability. A first candidate path can include a sloped yard labeled "slope," "grass." A second candidate path can include a stone staircase labeled "stairs," "stone." The system may receive data indicating heavy rain at the property. Based on the walking capability of the robot, and the heavy rain at the property, the system can select the second candidate path, due to the first candidate path likely being muddy due to the heavy rain.

The process 300 includes providing guidance information to the robot that guides the robot to the door along the selected path (314). For example, the monitoring server 130 can provide guidance information to the robot 120 that guides the robot 120 to the door 115 along the path 116. The guidance information can include, for example, a detailed model of the path 116, GPS coordinate waypoints along the path 116, step-by-step directions for traversing the path 116, etc. The guidance information can also include real-time commands based on a current position of the robot 120, as observed by the camera 110.

In some implementations, providing guidance information to the robot includes tracking a location and orientation of the robot as the robot approaches the door; and providing directions to the robot based on the tracked location and orientation of the robot to guide the robot to the door along the selected path. For example, the monitoring server 130 can track the location and orientation of the robot using images captured by the camera 110. Based on the tracked location and orientation, the monitoring server can provide directions to the robot, e.g., "turn left," "go straight," "back up," "turn right," "take a step down," "take a step up," etc.

In some implementations, providing guidance information to the robot includes providing prescribed directions to the robot to guide the robot to the door along the selected path. For example, once the monitoring server 130 has selected a path, the monitoring server 130 may transmit a set of instructions to the robot, e.g., "move west ten feet, turn ninety degrees to the right, take five steps down, move north seven feet, stop."

Figure 4:
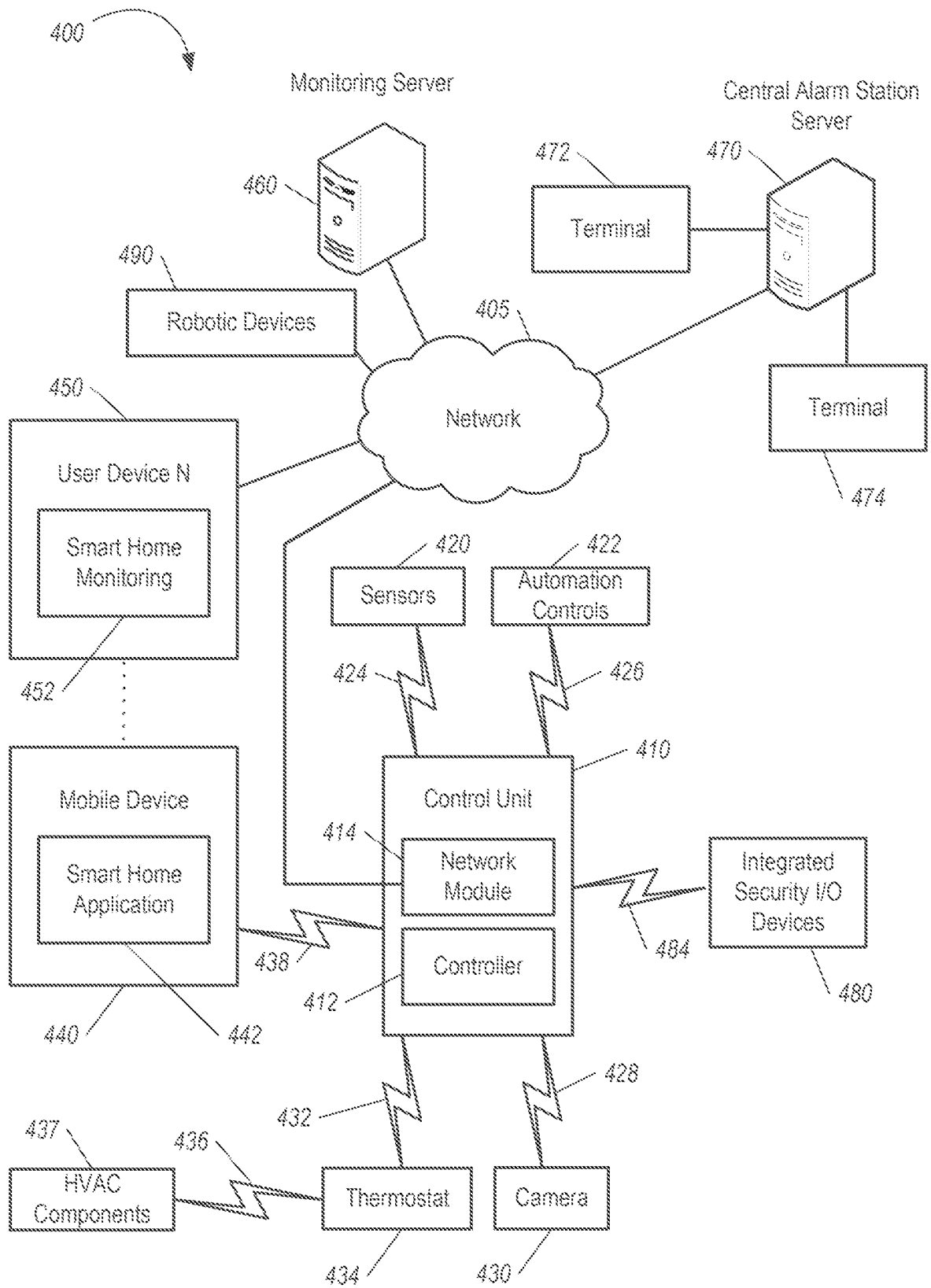
FIG. 4 is a diagram illustrating an example of a property monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home.

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Power-line" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400. For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method, comprising:
    obtaining, by a system comprising one or more processors, sensor data representing an autonomous vehicle;
    identifying, by the system, one or more movement structures of the autonomous vehicle that a) are represented by the sensor data and b) enable the autonomous vehicle to traverse a physical environment;
    determining, by the system, a destination for the autonomous vehicle;
    selecting, by the system, a path from a set of candidate paths to the destination using the identified one or more movement structures of the autonomous vehicle, each path of the set of candidate paths having at least one corresponding trajectory, wherein selecting the path comprises:
        selecting, using a particular movement structure of the identified one or more movement structures of the autonomous vehicle, the path that is a different path than would be selected for a different movement structure of the identified one or more movement structures of the autonomous vehicle; and
    instructing, by the system, the autonomous vehicle to travel along the selected path.

2. The method of claim 1, comprising:
    using the sensor data, determining a characteristic of a package that is being carried by the autonomous vehicle; and
    selecting the path from the set of candidate paths using the characteristic of the package that is being carried by the autonomous vehicle.

3. The method of claim 1, wherein:
    the one or more movement structures of the autonomous vehicle include a wheel; and
    selecting the path comprises selecting a path including a ramp.

4. The method of claim 1, wherein:
    the one or more movement structures of the autonomous vehicle include a stair climbing foot; and
    selecting the path comprises selecting a path including stairs.

5. The method of claim 1, wherein the sensor data includes one or more images of the autonomous vehicle.

6. The method of claim 5, wherein the one or more images of the autonomous vehicle are captured by a camera integrated with a doorbell of a property, and the destination comprises a doorway of the property.

7. The method of claim 1, wherein the destination comprises a drop-off location for a package carried by the autonomous vehicle.

8. The method of claim 1, wherein the destination comprises a secure area of a premises, the method comprising:
    receiving credential information for the autonomous vehicle; and
    in response to verifying the credential information for the autonomous vehicle, enabling access for the autonomous vehicle to the secure area of the premises.

9. The method of claim 1, wherein instructing the autonomous vehicle to travel along the selected path comprises:
    tracking a location and orientation of the autonomous vehicle as the autonomous vehicle approaches the destination; and
    using the tracked location and orientation of the autonomous vehicle to provide directions to guide the autonomous vehicle to the destination along the selected path.

10. The method of claim 1, wherein instructing the autonomous vehicle to travel along the selected path comprises transmitting prescribed directions to the autonomous vehicle to guide the autonomous vehicle to the destination along the selected path.

11. The method of claim 1, comprising:
    determining an environmental condition at a location of the autonomous vehicle, and
    selecting the path from the candidate paths in response to determining the environmental condition at the location of the autonomous vehicle.

12. The method of claim 1, wherein identifying the one or more movement structures of the autonomous vehicle comprises receiving, from the autonomous vehicle, a wireless communication indicating the movement structures of the autonomous vehicle.

13. The method of claim 1, wherein the one or more movement structures of the autonomous vehicle include at least one of a wheel, a stair climbing foot, a ski, a wing, a propeller, a tread, or a leg.

14. A system for monitoring a property, the system comprising one or more processors configured to perform operations comprising:
- obtaining, by the system, sensor data representing an autonomous vehicle;
- identifying, by the system, one or more movement structures of the autonomous vehicle that a) are represented by the sensor data and b) enable the autonomous vehicle to traverse a physical environment;
- determining, by the system, a destination for the autonomous vehicle;
- selecting, by the system, a path from a set of candidate paths to the destination using the identified one or more movement structures of the autonomous vehicle, each path of the set of candidate paths having at least one corresponding trajectory, wherein selecting the path comprises:
  - selecting, using a particular movement structure of the identified one or more movement structures of the autonomous vehicle, the path that is a different path than would be selected for a different movement structure of the identified one or more movement structures of the autonomous vehicle; and
- instructing, by the system, the autonomous vehicle to travel along the selected path.

15. The system of claim 14, the operations comprising:
- using the sensor data, determining a characteristic of a package that is being carried by the autonomous vehicle; and
- selecting, from the set of candidate paths, the path using the characteristic of the package that is being carried by the autonomous vehicle.

16. A non-transitory computer-readable medium storing software comprising instructions executable by a system comprising one or more processors which, upon such execution, cause the system to perform operations comprising:
- obtaining, by the system, sensor data representing an autonomous vehicle;
- identifying, by the system, one or more movement structures of the autonomous vehicle that a) are represented by the sensor data and b) enable the autonomous vehicle to traverse a physical environment;
- determining, by the system, a destination for the autonomous vehicle;
- selecting, by the system, a path and from a set of candidate paths to the destination using the identified one or more movement structures of the autonomous vehicle, each path of the set of candidate paths having at least one corresponding trajectory, wherein selecting the path comprises:
  - selecting, using a particular movement structure of the identified one or more movement structures of the autonomous vehicle, the path that is a different path than would be selected for a different movement structure of the identified one or more movement structures of the autonomous vehicle; and
- instructing, by the system, the autonomous vehicle to travel along the selected path.

17. The method of claim 1, comprising:
accessing the set of candidate paths from a database, wherein each candidate path is labeled with at least one movement structure that enables travel along the candidate path.

18. The method of claim 17, wherein selecting the path comprises comparing the identified one or more movement structures to the labels of the candidate paths accessed from the database.

19. The system of claim 14, the operations comprising:
accessing the set of candidate paths from a database, wherein each candidate path is labeled with at least one movement structure that enables travel along the candidate path,
wherein selecting the path comprises comparing the identified one or more movement structures to the labels of the candidate paths accessed from the database.

* * * * *